United States Patent [19]

Chapin

[11] 4,029,979

[45] June 14, 1977

[54] FLUIDIC TO ELECTRIC TRANSDUCER AND METHOD

[75] Inventor: Donald W. Chapin, Scottsdale, Ariz.

[73] Assignee: The Garrett Corporation, Los Angeles, Calif.

[22] Filed: May 13, 1976

[21] Appl. No.: 685,853

Related U.S. Application Data

[63] Continuation-in-part of Ser. No. 587,457, June 16, 1975.

[52] U.S. Cl. .................................. 310/8.2; 137/83
[51] Int. Cl.² ........................................ H01L 41/04
[58] Field of Search ............... 310/8, 8.1, 8.2, 8.3; 73/194 A, 194 B, 194 C; 137/81.5, 83

[56] References Cited

UNITED STATES PATENTS

| | | | |
|---|---|---|---|
| 3,519,009 | 7/1970 | Rubin | 310/8.1 X |
| 3,626,982 | 12/1971 | McDuffle | 137/83 X |
| 3,746,044 | 7/1973 | Velicer | 137/83 X |

*Primary Examiner*—Mark O. Budd
*Attorney, Agent, or Firm*—James W. McFarland; Albert J. Miller

[57] ABSTRACT

The subject transducer consists basically of a flexible element, such as a wire, formed and supported to vibrate at a frequency depending, in part, upon the tension of the element. Means are provided to vary the tension of the element in accordance with a condition which it is proposed to monitor and a fluidic circuit is associated with the element to create a signal in accordance with the vibration of the element, the signal in turn being applied to an electric means to convert the signal into one which can actuate an electrical meter or the like. The device may be modified to include means for initially adjusting the tension of the element to set the system on zero indication and other means for adjusting the tension automatically to compensate for temperature variations.

20 Claims, 6 Drawing Figures

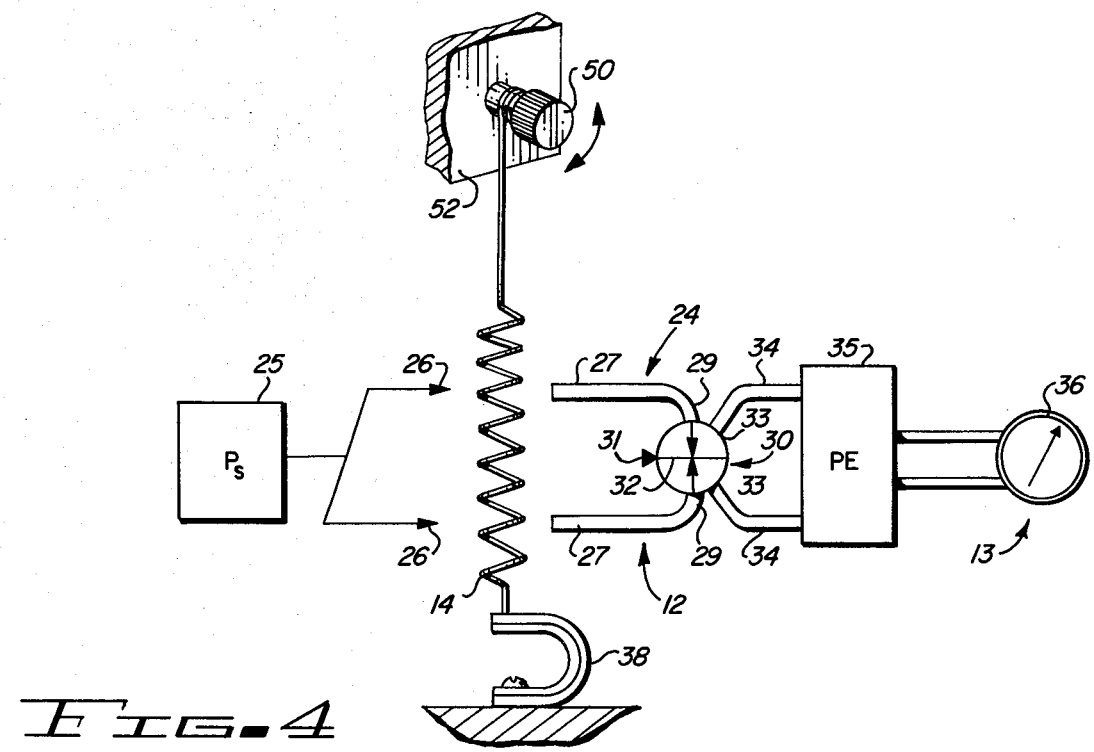
Fig. 4
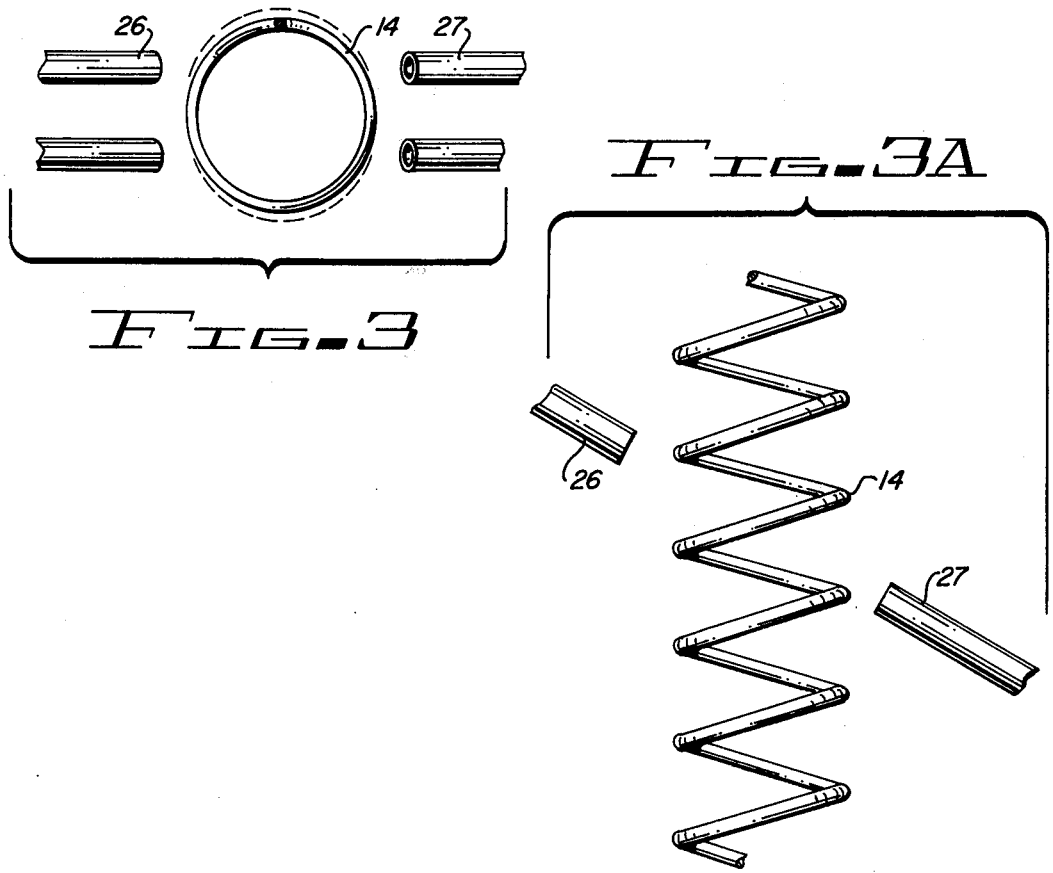
Fig. 3
Fig. 3A

FLUIDIC TO ELECTRIC TRANSDUCER AND METHOD

BACKGROUND OF THE INVENTION

This is a continuation-in-part application of my co-pending U.S. patent application Ser. No. 587,457, filed June 16, 1975.

In the operation of automatic systems, such as manufacturing, refining, and the like, there is frequently a need to monitor operations of different sections of such systems or mechanisms forming a part thereof. To satisfy this need, use is made of sensors and indicating devices, the sensors being responsive to changing conditions in an environment or mechanism to transmit a signal via one or more mediums to a remotely located indicator.

The present invention resulted from efforts to provide improved means for meeting the need mentioned above, such means having a pressure differential sensor, a vibratory device responsive to signals from such sensor to create pulsating signals in a fluidic system and means cooperating with the latter system for generating electric signals proportional to the sensed pressure differentials to indicate the strength thereof.

SUMMARY OF THE INVENTION

The present invention relates generally to indicating devices and methods, and more particularly to such means which are responsive to changing conditions in an environment, a system, a mechanism, etc., to give evidence of such change, particularly at a remote location.

More specifically, the invention relates to apparatus and method for sensing a change in a condition in one medium, converting the sensed signal to a signal in another medium, amplifying the signal in the latter medium, and utilizing the amplified signal to generate still another signal for operating a visual or recording indicator.

Still more particularly, the invention relates to vibratory means associated with a fluidic circuit for producing pulsating signals therein in response to variations in frequency of the vibrations resulting from sensed changes in a condition in a system, a mechanism, or the like, the fluidic circuit having one or a series of elements for amplifying the pulsating signals, and means, such as a piezoelectric pickup for converting the amplified signals into electric forces which are eventually employed to power an indicator.

An object of the invention is to provide an indicating mechanism having an element mounted for vibratory movement at a frequency dependent upon a condition to be monitored, the element being associated with a fluidic system in such a manner that vibration of the element will repeatedly interrupt a fluidic jet to cause a pulsating pressure signal which is in turn amplified and applied to a device which utilizes the pressure pulsations to produce electric signals for actuating an indicator.

A further object of the invention is to provide the indicating mechanism mentioned in the preceding paragraph with selectively actuated means for calibrating the device to secure a zero indicator reading and other means for adjusting the mechanism to compensate for temperature change.

Other objects and advantages will be apparent from the following description of preferred embodiments of the invention selected for illustration in detail in the accompanying drawings.

BRIEF DESCRIPTION OF THE DRAWINGS

FIGS. 3 and 3A are enlarged, partial, top and side elevational views similar to FIG. 1 but showing an alternate disposition of the nozzles and receivers; and FIG. 4 is a view similar to FIG. 1 but showing an alternate arrangement of the invention.

DESCRIPTION OF THE PREFERRED EMBODIMENTS

Figure 1:
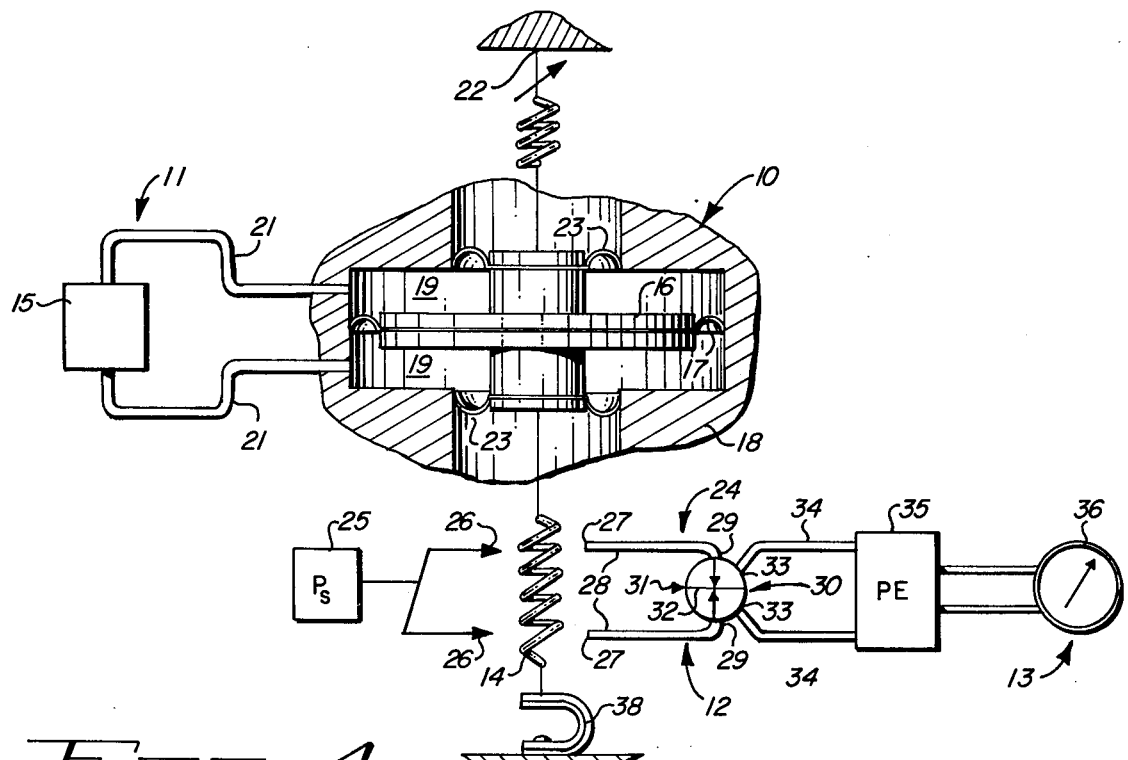
FIG. 1 is a schematic side elevational view of an indicating system provided with a fluidic to electric transducer formed in accordance with the present invention.

Particular reference to the drawing discloses that the invention herein basically includes a vibratory assembly 10, a condition sensing mechanism 11, a fluidic circuit 12, and indicating means 13.

In the form of the invention selected for illustration the vibratory assembly 10 includes a coil spring 14 which is suitably supported at its ends under tension for free vibratory action. The frequency of vibration of a free wire or spring is a unique function of its tension as expressed in the equation:

$$\text{frequency} = \frac{1}{2 \text{ length (in)}} \sqrt{\frac{\text{tension (No.)}}{\text{area (in}^2\text{) density} \left(\frac{\text{MASS}}{\text{in}^3}\right)}}$$

all other factors being kept constant. In this invention, changes in the condition being monitored are employed to vary the tension and ultimately the frequency of vibration of the spring 14. To secure this effect, the changing condition is sensed at 15 and converted to a fluid pressure differential which is applied to a diaphragm assembly 16. This assembly has a main diaphragm 17 peripherally clamped in a casing 18 and dividing the interior thereof into a pair of chambers 19 which receive the pressures of the differential from the sensor through lines 21.

At one side, the diaphragm 17 is connected with one end of the spring 14. The other side of the diaphragm is connected as at 22 with a suitable support. Flexible seals 23 close the chambers 19 around the connection between the diaphragm 17 and the spring and between the diaphragm and the support to permit movement of the diaphragm without loss of pressure. If found desirable or necessary the connection 22 is selectively adjustable to calibrate the indicating mechanism at zero.

It should be noted that while the diaphragm assembly is shown for use with two contained pressures a single pressure could be employed at one side of the diaphragm and the other side exposed to the atmosphere without departing from the invention. It should also be noted that a capsule or a piston and cylinder could be employed to apply the sensed signal to the spring. The higher pressure of the differential is applied to the side of the diaphragm that is connected to the spring and changes in such pressure will vary the tension of the spring in accordance with the changes sensed in the condition being monitored.

Figure 2:
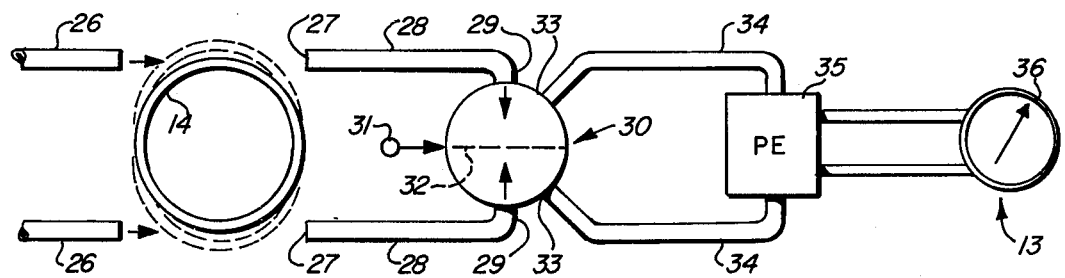
FIG. 2 is a horizontal sectional view taken through a portion of the system shown in FIG. 1.

The spring 14, or other vibratory element, is associated with a fluidic circuit 24 which has a source 25 of fluid pressure and at least one and preferably two, as shown, nozzles 26 which direct fluid jets toward receiver members 27. As shown in FIG. 2, the nozzles 26 are arranged so that the jets are substantially tangent to the spring 14. As the jet flow from the nozzles they impinge the spring and cause it to vibrate at a frequency dependent upon the tension of the spring. As the spring vibrates it will repeatedly interrupt the jets and obviously the fluid flow to the receivers 27 which are disposed at the opposite side of the spring from the nozzles. This repeatedly interrupted flow will create pulsating signals in the lines 28 leading from the receiver members.

Lines 28 lead to control ports 29 of a substantially conventional fluidic amplifier 30. This element could be either a single stage amplifier or the first in a series of stages according to the needs and desires of the manufacturer. The amplifier 30, as usual, receives fluid under pressure from a source 31 and directs a fluid beam 32 toward a pair of output ports 33. The pulsating signals supplied to the control ports 29 will impinge the beam 32 causing it to move between output ports 33 and cause amplified signals to flow through lines 34 leading therefrom. These lines extend to ports in a suitable pickup transducer, such as a piezo-electric device 35. Pressure signals applied to the device 35 create an electric signal which is proportional to the signal sensed by the mechanism 11 and may be observed on a suitable indicator 36 connected with lines 37. If desired suitable amplifying means may also be employed in advance of the indicator 36.

In the use of the transducer forming the subject matter of the invention, it may be found desirable, or necessary, to compensate for temperature change. To do so a bimetallic element 38 may be disposed between the end of the spring 14 opposite that connected with the diaphragm assembly and the adjacent support. It will be obvious that as temperatures change, the element 38 will flex to increase or decrease the tension of the spring 14 and compensate for such change.

From the foregoing it will be observed that a system for sensing changes in a condition has been provided, the system having a novel fluidic to electric transducer with which minute changes can be sensed and transmitted by a plurality of mediums from one portion of the system to another and amplified sufficiently to provide satisfactory indication. The system utilizes the vibratory action of an element, the frequency of which is varied in accordance with the changes in the condition being monitored, to control a fluidic circuit which in turn motivates an electrical unit used to supply signals proportional to the condition changes to an indicator.

Figure 1A:
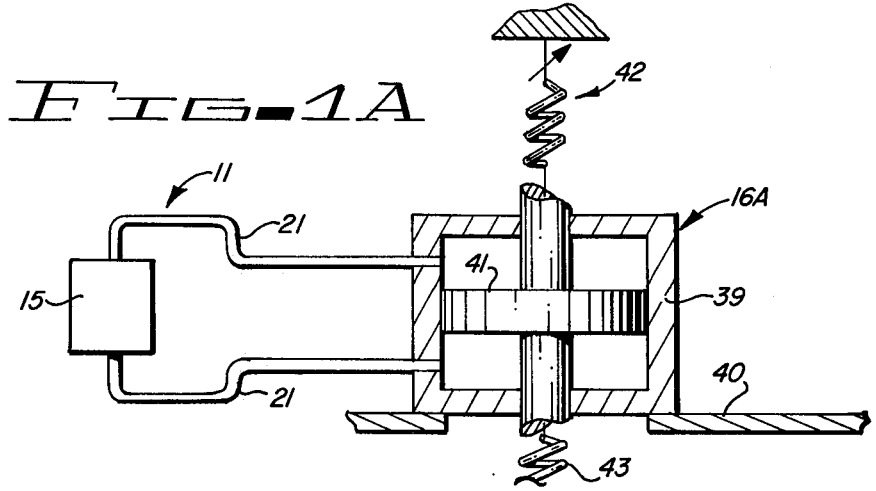
FIG. 1A is a similar view of a slightly modified system.

As mentioned previously, the diaphragm assembly 16 could be replaced by other pressure responsive devices, such as the piston and cylinder means 16A shown in FIG. 1A. In this modified form of the invention the cylinder 39 is suitably mounted on a stationary support 40 and the piston 41 therein is connected at one side to a support through a zero calibration means 42. At the other side the piston is connected to the flexible vibratory member 43. The apparatus and its operation is otherwise substantially identical with that shown in FIG. 1.

From the foregoing it will be apparent that the present arrangement provides a spring 14 which is self-excited into vibraton at its natural frequency by virtue of the relatively small side forces imparted thereto by the fluid jet from nozzles 26. In this connection, as set forth specifically in the equation given above, a free wire under tension vibrates at its natural frequency once set into motion so long as there is no external, dominating force which exceeds the exciting, vibratory forces as defined by the well known solution to the differential wave equation from which the equation set forth above is derived. The fluid jet from nozzles 26 alternately produce Karman vortex type disturbances on the downstream side of the spring 14 as these jets are alternately interrupted. This disturbance sets up the "non-dominant" side force which induces the spring into its self-exciting, resonant vibration since the movement of the spring itself causes the interruption of the fluid jets and thus creates the side force for energizing the vibration.

It will also be apparent that the size and spacing of the coils of spring 14 must be so related to the size of nozzles 26 that the interruption of the fluid jets is maintained as the tension in spring 14 is altered. One successful embodiment of the present invention utilizes nozzles 26 whose sizes are sufficiently large to cross at least two coils of spring 14. Spring 14 is of a type having a minimum distance between coils such that in relation to the size of nozzles 26, continuation of the interruption of the jets occurs as the tension of spring 14 is altered. The nozzle diameter preferably is greater than the maximum gap between adjacent spring coils, which maximum gap occurs whenever the spring is placed under maximum tension by the input signal.

In this latter connection it will also be apparent that nozzles 26 and 27 may be arranged obliquely to the edges of the coils of spring 14, as illustrated in FIGS. 3 and 3A, to further reduce the possibility of stoppage of alternate interruption of the jets. Further, that portion of the spring 14 where the nozzles impinge may instead be replaced by essentially a hollow cylinder of diameter approximately equal to the other diameter of the spring 14 illustrated. It will also be apparent that the spring may also be solid, and thus in essence a straight wire instead of the coil spring 14. The coil spring illustrated is chosen as the preferred embodiment because of its very light weight in comparison to the size of its outer diameter thereby providing a highly undamped system providing fast, sensitive response to change in tension.

Accordingly, from the foregoing it will be seen that the present invention is capable of transforming a pressure signal or a pressure differential signal into a pulsating signal capable of driving a frequency responsive piezoelectric device 35. In this connection it will be apparent to those skilled in the art that impressing a pressure signal upon the device 35 will not produce an output signal since the device 35 is responsive to a modulating, pulsating, pressure differential signal. While the pulsating pressure differential signal carried in conduits 34 is capable of producing a useful output such as a fluidic control system, by transformation of the signal to an electrical signal the latter may be transmitted through extremely long distances without sacrifice in or degradation of the output signal. In this connection a frequency signal can be transmitted through long distances without substantial degradation since only minor phase shift can occur, which phase shift will have minimal effect on the output indicating means 13 which is only sensitive to frequency.

The embodiment illustrated in FIG. 4 is similar to that illustrated in FIG. 1 with the exception that the tension of spring 14 is altered by direct mechanical elongation of the supporting wire rather than through the fluid pressure differential diaphragm assembly 16. Thus, the embodiment illustrated in FIG. 3 is highly useful as an extremely sensitive signal input transducer, and is particularly useful as a speed position, or motion indicator mechanism. In this respect the tension of spring 14 may be altered simply by rotating a knob 50 mounted to control board 52. The system operates as described previously to produce an output electrical signal whose frequency varies in response to movement of knob 50. Thus, knob 50 may be utilized as a speed set input mechanism with the resulting output electrical system acting as an electrical input command signal to an electrical control system. As the frequency of this command signal is altered by movement of the knob 50, the electrical system can function to modify a control system as desired. For instance, the input command signal may establish a desired speed of operation of a component, and a feedback loop may be incorporated with the system illustrated in order to automatically adjust the knob 50 when a desired null condition is reached.

From the preceding description of preferred arrangements it will be apparent that the present invention provides an improved method of generating a frequency output signal in proportion to a mechanical input signal which includes adjusting the tension of spring 14 in relation to the input signal, inducing the spring to vibrate at a frequency determined by its tension. The vibrating spring is utilized to generate a pulsating fluidic frequency output signal, and this latter signal may be converted to an electrical frequency signal if desired.

Having described the invention with sufficient clarity that those skilled in the art may make and use it, I claim:

1. A fluidic to electric transducer comprising:
   an element supported under tension for vibratory movement;
   means responsive to a variable fluidic input to change the tension of said element;
   a second means directing a jet of fluid under pressure against said element to cause vibration thereof at the frequency determined by the tension of said element, such vibration converting said fluid jet into a pulsating signal; and
   means receiving said pulsating signal and converting the same into an electric signal proportional to the fluidic input employed to change the tension of said element.

2. The fluidic to electric transducer of claim 1 in which the element supported for vibratory movement is a wire.

3. The fluidic to electric transducer of claim 1 in which the element supported for vibratory movement is a spring.

4. The fluidic to electric transducer of claim 1 in which the means responsive to a variable fluidic input to change the tension of said element in a diaphragm assembly.

5. The fluidic to electric transducer of claim 1 in which fluidic means are provided to amplify the pulsating signal.

6. The fluidic to electric transducer of claim 4 in which means are provided to apply a fluid pressure differential to opposite sides of a diaphragm in said assembly.

7. The fluidic to electric transducer of claim 1 in which the means responsive to a variable fluidic input to change the tension of said element is a piston and cylinder assembly.

8. The fluidic to electric transducer of claim 1 in which means are provided to selectively adjust the tension of said element for zero calibration.

9. The fluidic to electric transducer of claim 1 in which the means for directing a jet of fluid under pressure against said element to cause vibration thereof has a pair of nozzles oriented substantially tangent to said element to induce vibration thereof and the creation of the pulsating fluidic signal.

10. The fluidic to electric transducer of claim 5 in which the fluidic means receiving the pulsating fluidic signal comprises a fluidic amplifier.

11. The fluidic to electric transducer of claim 5 in which the means receiving the amplified output signal from the fluidic means is a piezoelectric device.

12. The fluidic to electric transducer of claim 1 in which the means are provided to change the tension of said element to compensate for temperature change.

13. The fluidic to electric transducer of claim 12 in which the temperature change compensating means is a bimetallic member.

14. A fluidic to electric transducer comprising:
   a flexible element supported at its ends under tension for vibratory movement;
   a first means between said element and its adjacent support responsive to the application of fluid pressure to vary the tension of said element;
   a fluidic circuit having spaced nozzle and receiver means, said nozzle means receiving fluid under pressure from a source and directing a jet toward said receiver means, the nozzle and receiver means being disposed on opposite sides of said flexible element so that flow from said nozzle means to said receiver means will cause vibration of the element which will intermittently interrupt flow from said nozzle to said receiver and provide a pulsating signal;
   a fluidic amplifier connected in the circuit to receive the pulsating signal and provide an amplified output signal; and
   means connected with said fluidic amplifier and responsive to the amplified output signal to produce an electric signal proportional to the fluid pressure applied to said first means to vary the tension of said element.

15. A fluidic to electric transducer comprising:
   a coil spring supported at its ends under tension for vibratory movement;
   a diaphragm assembly connected between one end of said spring and the adjacent support;
   means for applying a fluid pressure differential to opposite sides of a diaphragm in said assembly to adjust the tension of said spring;
   a pair of nozzles receiving fluid pressure from a source and directing jets of fluid tangent to said spring to induce vibration thereof, such vibration serving to intermittently interrupt the jets and create pulsating signals;
   fluidic means receiving said pulsating signals and producing amplified output signals; and piezoelectric means receiving said amplified output signals and converting the same into electric signals proportional to the fluid pressure differential applied to said diaphragm.

16. The fluidic to electric transducer of claim 3 wherein said second means comprises a pair of fluid nozzles, the diameter of each of said nozzles being greater than the gap between adjacent coils of said spring.

17. The fluidic to electric transducer of claim 3 wherein said spring is supported longitudinally along its longitudinal axis for vibration in a transverse direction, said second means arranged whereby said jets of fluid therefrom issue in a direction substantially perpendicular to said longitudinal axis and said transverse direction.

18. A transducer comprising:
an element supported under tension for vibratory movement;
means for changing the tension of said element; and
second means directing a jet of fluid under pressure against said element to cause vibration thereof at its natural frequency as determined by said tension of the element, said vibration converting said fluid jet into a pulsating signal having a frequency proportional to the tension of said element.

19. The transducer of claim 18, further including means for receiving said pulsating signal and converting the latter into an electrical signal whose frequency is proportional to the tension of said element.

20. A method of generating a frequency output signal in proportion to a mechanical input signal, comprising steps of:
inducing an element supported longitudinally under tension to vibrate transversely at its natural frequency by directing a fluid jet in interrupting relationship with said element;
adjusting the tension of said element in relation to said mechanical input signal to vary the frequency of vibration of said element;
generating a pulsating fluidic output signal having a frequency in relation to the frequency of vibration of said element by periodically interrupting the fluid jet with said element to produce a pulsating jet whose frequency is proportional to the tension of the element;
maintaining said periodic interruption of the fluid jet at all values of tension of said element produced by said mechanical input signal;
amplifying the pulsating fluidic signal; and
converting the amplified pulsating fluidic signal to an electrical frequency output signal whose frequency is proportional to said mechanical input signal.

* * * * *